United States Patent [19]

Schweizer

[11] Patent Number: 4,992,401
[45] Date of Patent: Feb. 12, 1991

[54] NOBLE METAL ALKALINE ZEOLITES FOR CATALYTIC REFORMING

[75] Inventor: Albert E. Schweizer, Baton Rouge, La.

[73] Assignee: Exxon Research & Engineering Company, Florham Park, N.J.

[21] Appl. No.: 292,781

[22] Filed: Jan. 3, 1989

[51] Int. Cl.$^5$ .............................................. B01J 29/32
[52] U.S. Cl. ........................................ 502/74; 502/66
[58] Field of Search ............................ 502/66, 74, 171

[56] References Cited

U.S. PATENT DOCUMENTS

| | | | |
|---|---|---|---|
| 3,267,076 | 8/1966 | Ishii et al. | 502/171 |
| 3,376,215 | 4/1968 | Bertolacini et al. | 502/66 |
| 3,794,600 | 2/1974 | Schutt | 502/74 |
| 3,862,994 | 1/1975 | Yates | 502/171 |
| 4,613,424 | 9/1986 | Schorfheide | 208/65 |

*Primary Examiner*—Carl F. Dees
*Attorney, Agent, or Firm*—Henry E. Naylor

[57] ABSTRACT

Disclosed is a process for preparing noble metal-containing zeolites suitable for use in catalytic reforming which process comprises: (a) treating an alkaline faujasites or L-type zeolites with Pt(acetylacetonate)$_2$ or Pd(acetylacetonate)$_2$ for an effective amount of time to form a substantially homogeneous mixture and to incorporate Pt and/or Pd into the pore regions of the zeolite, but not to disperse it throughout the entire zeolite; and (b) calcining the mixture at a temperature from about 250° C. to about 600° C. for an effective amount of time.

7 Claims, 2 Drawing Sheets

HEPTANE REFORMING CATALYSTS

NOBLE METAL ALKALINE ZEOLITES FOR CATALYTIC REFORMING

FIELD OF THE INVENTION

The present invention relates to noble metal-containing alkaline faujasite and L-type zeolites having exceptional activity and stability for catalytic reforming, and a method for making them.

BACKGROUND OF THE INVENTION

Catalytic reforming is a well established petroleum process for improving the octane quality of naphthas and straight run gasolines. In fact, it is the primary source of octane in the modern refinery. Reforming can be defined as the total effect of the molecular changes, or hydrocarbon reactions, produced by dehydrogenation of cyclohexanes and dehydroisomerization of alkylcyclopentanes to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst. In catalytic reforming, a multifunctional catalyst is usually employed, which contains a hydrogenation-dehydrogenation component, or components, usually platinum, substantially atomically dispersed on the surface of a porous, inorganic oxide supporter. While such catalysts are widely used in the industry today, they are limited in their use to relatively high pressures and temperatures, which are needed to obtain desirable liquid yields. Thus, much work is being done to develop catalyst systems which will operate at lower temperatures and pressures without substantial loss in activity. One such catalyst system which has been suggested includes the use of noble metal large pore zeolites which might provide greater dehydrocyclization selectivity and hence better liquid yields when compared to conventional reforming catalysts.

The leading candidates among the zeolites for use in catalytic reforming are faujasites and L-type zeolites. Faujasites, with their large, three dimensional, pore system continue to play a dominant role in the petroleum industry as excellent hydrocarbon conversion catalysts. While much work has been done through the years in developing faujasites for petroleum industry use, it has primarily been directed to their use in fluid catalytic cracking (FCC). This of course being the case since FCC plays such an important role in the modern refinery for producing gasoline by the most economical route.

Because of the availability of large quantities of such large pore zeolites, attempts have been made to use them as supports for reduced metals to catalyze hydrogenation-dehydrogenation reactions, which reactions are important in catalytic reforming. The primary petroleum applications, other than FCC, in which some degree of commercial success has been achieved using large pore zeolites has been at relatively high hydrogen pressures over nickel on offeritite and palladium on ultra stable Y zeolite for selective hydrocracking.

Attempts have been made to incorporate noble metals onto the alkaline faujasites sodium zeolite X, and sodium zeolite Y, as well as on zeolite L, for use in such lower pressure processes as aromatization, hydrogenation, and isomerization, all of which are important reactions for catalytic reforming. For example, U.S. Pat. No. 4,417,083, teaches the incorporation of noble metals onto zeolites such as faujasites X, faujasite Y, and zeolite L by: impregnation with an aqueous solution of a salt, or of a platinum complex such as hexachloroplatinic acid, dinitrodiaminoplatinum or platinum tetramine chloride; and by ion exchange with an aqueous solution of a platinum cationic complex like platinum tetramine chloride. Ion-exchange is also taught in U.S. Pat. No. 3,953,365. While such noble metal zeolite catalysts show improvement over conventional noble metal alumina catalysts, with regard to dehydrocyclization, they suffer from the disadvantage of coking at pressures most desirable for reforming. Furthermore, because of their limited pore size, L-type zeolites face an additional problem in that their pores become blocked when faced with full range naphthas which contain hydrocarbons having eight or more carbon atoms.

Recently, platinum in zeolite L has been proposed as a catalyst for paraffin aromatization at relatively mild conditions. However, platinum in the faujasite structure, when prepared in substantially the same way as the preparation of platinum in zeolite L, does not give acceptable hydroconversion catalytic activity, selectivity, and stability.

Consequently, there still exits a need in the art for the development of large pore zeolites in such petroleum processes as reforming, isomerization, and hydrogenation. There is a particular need for a large pore zeolite, such as a faujasite, that will not coke excessively at relatively low pressure hydroconversion conditions, that can be pushed to relatively high temperatures to achieve additional conversion, and that will be able to withstand petroleum feedstocks having relatively heavy hydrocarbons.

SUMMARY OF THE INVENTION

In accordance with the present invention, there is provided a noble metal-containing zeolite selected from the alkaline faujasites and L-type zeolites which are suitable for use in catalytic reforming. The catalysts are prepared by:
(a) treating a zeolite material selected from the group consisting of the alkaline faujasites and L-type zeolites, with a noble-metal containing compound selected from Pt(acetylacetonate)$_2$ and Pd(acetylacetonate)$_2$, or both, for a time sufficient to form a substantially homogeneous mixture and to incorporate the platinum and/or palladium into the near surface regions of the zeolite material, but not so long as to disperse the platinum and/or palladium throughout the entire zeolite; and
(b) calcining the heated zeolite at a temperature from about 250° C. to about 600° C. for an effective amount of time.

In preferred embodiments of the present invention, the faujasite material is selected from sodium zeolite X and sodium zeolite Y and the noble metal containing compound is Pt(acetylacetonate)$_2$.

In other preferred embodiments of the present invention, the zeolite catalysts are prepared by dry-mixing the zeolite and the noble metal containing compound, then calcining the dry mix at a temperature from about 250° C. to 600° C.

DETAILED DESCRIPTION OF THE INVENTION

Figure 1:
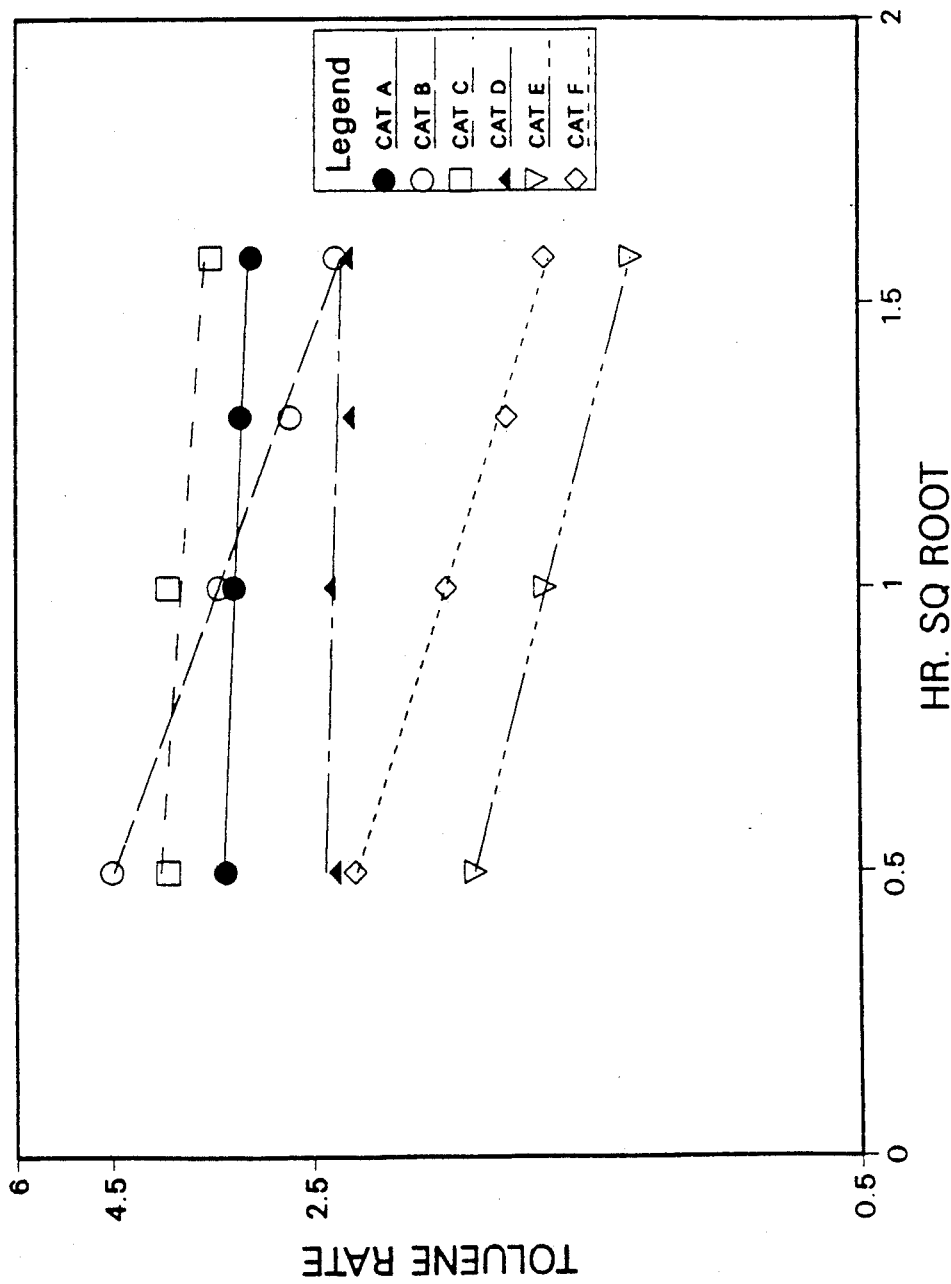
FIG. 1 is a plot of the data obtained in the heptane reforming test of the instant examples for Catalysts A thru F.

Zeolite compositions suitable for use herein are the alkaline faujasites and L-type zeolites. Such zeolites have apparent pore sizes on the order of about 7 to 9 Angstroms. By L-type zeolite is meant a zeolite which is substantially isostructural to zeolite L. A composition of L-type zeolite, expressed in terms of mole ratios of oxides, may be represented as follows:

wherein M is a cation, preferably potassium, n is the valence of M, and y may be any value from 0 to 9. Zeolite L, its X-ray diffraction pattern, its properties, and method for its preparation are described in detail in U.S. Pat. No. 3,216,789, which is incorporated herein by reference. The actual formula may vary without changing the crystalline structure; for example, the mole ratio of silica to aluminum (Si/Al) may vary from 1.5 to 3.5.

The chemical formula for alkaline zeolite Y expressed in terms of mole ratio of oxides may be written as:

wherein M is an alkali or alkaline-earth metal, n is the valence of M, x is a value greater than 3 and up to about 6, and y may be a value up to about 9. Zeolite Y has a characteristic X-ray powder diffraction pattern which may be employed with the formula for identification. Zeolite Y is described in more detail in U.S. Pat. No. 3,130,007, which is also incorporated herein by reference.

Alkaline zeolite X is a synthetic crystalline zeolitic material sieve which may be represented by the formula:

wherein M is an alkali metal or alkaline-earth metal, n is the valence of M, and y may have a value up to about 8 depending on the identity of M and the degree of hydration of the crystalline zeolite. Zeolite X, its X-ray diffraction pattern, its properties, and method of preparation are described in U.S. Pat. No. 2,882,244, which is incorporated herein by reference.

The preferred zeolites are the faujasites because they can run a full range of petroleum feedstocks and are not limited to converting hydrocarbons having up to about 8 carbon atoms as the L-type zeolites are.

The compositions of the present invention are prepared by treating the zeolite with an effective amount of a noble-metal containing compound selected from Pt(acetylacetonate)$_2$ or Pd(acetylacetonate)$_2$, also sometimes referred to herein as Pt(acac)$_2$ and Pd(acac)$_2$. An effective amount of noble metal compound is that amount which will result in a catalyst containing from about 0.5 to 10 wt. %, preferably from about 0.5 to 5 wt. %, and more preferably from about 0.75 to 1.5 wt. % noble metal, based on the total weight of the catalyst. The zeolite can be treated by merely mixing together the Pt- and/or Pd(acac)$_2$ and zeolite; or by treating the zeolite with the Pt- and/or Pd(acac)$_2$ in an organic solvent, such as toluene, for an effective amount of time. Effective amount of time means for a time which will allow the Pt and/or Pd to be introduced into the zeolite at or near the surface, but not so long as to allow the Pt and/or Pd to be impregnated throughout the entire zeolite structure. That is, the noble metal will be impregnated no more than 90%, preferably no more than 80%, into the interior of the zeolite. After the zeolite is treated with the Pt- and/or Pd(acac)$_2$, it is calcined at a temperature from about 250° C. to about 600° C. If the zeolite and the Pt or Pd(acac)$_2$ are dry-mixed, the dry-mix must be calcined for the same effective amount of time as indicated above. For example, at a temperature from about 300° C. to about 400° C. an effective amount of time will be from about 5 minutes to about 4 hours.

It has unexpectedly been found that only when the noble metal containing zeolite materials of the present invention are prepared by the method of this invention, can they be used in catalytic reforming without rapidly losing their activity. That is, the zeolite catalyst of this invention maintains an unexpectedly high degree of activity for an extended period of time. If platinum, and/or palladium, is incorporated into the zeolite in accordance with prior art methods, such as by ion-exchange, or by treatment with an aqueous solution of a salt of a platinum or palladium complex, such as hexachloroplatinic acid, dinitrodiaminoplatinum or platinum tetramine chloride, the resulting Pt- and/or Pd-containing zeolite is not acceptable for use in catalytic reforming.

Feedstocks suitable for reforming with the faujasite catalysts of this invention are generally naphtha fractions boiling in the range of about 70° F. to about 550° F., preferably boiling from about 150° F. to about 450° F. The feedstock can be either a straight-run naphtha or a thermally cracked or catalytically cracked naphtha, or blends thereof. Preferably, the feed should be substantially free of sulfur, that is, the feed should preferably contain less than about 5 ppm sulfur, and most preferably less than about 1 ppm sulfur. The sulfur content is determined on the weight of sulfur to weight of feed. For L-type zeolite catalysts of this present invention, the feedstocks will be substantially free of hydrocarbon moieties having greater than 8 carbon atoms.

The zeolite compositions of the present invention may be used in any conventional reforming process. General process conditions for catalytic reforming include:

| Major Operating Variables | Typical Process Conditions | Preferred Process Conditions |
| --- | --- | --- |
| Pressure, psig | 50–750 | 100–300 |
| Reactor Temp. °F. | 750–1100 | 850–1000 |
| Gas Rate, SCF/B | 1500–10,000 | 2000–7000 |
| Feed, W/W/Hr | 0.5–10 | 1–3 |

Reforming reactions are both endothermic and exothermic, the former being predominant, particularly in the early stages of reforming with the latter being predominant in the latter stages. In view thereof, it has become the practice to employ a reforming process unit comprised of a plurality of serially connected reactors with provision for heating of the reaction stream from one reactor to another. There are three major types of reforming: semiregenerative, cyclic, and continuous. Fixed-bed reactors are usually employed in semiregenerative and cyclic reforming, and moving-bed reactors in continuous reforming. In semiregenerative reforming, the entire reforming process unit is operated by gradually and progressively increasing the temperature to compensate for deactivation of the catalyst caused by coke deposition, until finally the entire unit is shutdown for regeneration and reactivation of the catalyst. In cyclic reforming, the reactors are individually isolated, or in effect, swung out of line, by various piping arrangements. The catalyst is regenerated by removing coke deposits, and then reactivated while the other reactors of the series remain on stream. The so called "swing reactor" temporarily replaces a reactor which is removed from the series for regeneration and reactivation of the catalyst, which is then put back in the series. In continuous reforming, the reactors are moving-bed reactors, as opposed to fixed-bed reactors, with continuous addition and withdrawal of catalyst with the catalyst being regenerated in a separate regeneration vessel.

The following examples serve to more fully describe the present invention. It is understood that these examples in no way are intended to limit the true scope of this invention but rather are presented for illustrative purposes.

COMPARATIVE EXAMPLE 1

A commercial reforming catalyst available from American Cyanamid under the designation KX-120 was treated in air at 932° F. for 17 hours, then sulfided to sulfur breakthrough at 932° F., followed by hydrogen stripping for 2 hours, again at 932° F. This catalyst is comprised of about 0.3 wt. % Pt and 0.3 wt. % Re on gamma alumina. The resulting catalyst, which we refer to as Catalyst A, was then used in heptane reforming as indicated below and the results shown in FIG. 1 hereof. This catalyst was also used in full range naphtha reforming and the results shown in FIG. 2 hereof.

COMPARATIVE EXAMPLE 2

Catalyst B was prepared by treating(ion exchanging) 20 grams of anhydrous sodium zeolite Y (LZY-52 from Union Carbide) with a 0.1N aqueous solution of $Pt(NH_3)_4^{2+}$ (as the chloride) for 30 minutes at 25° C. The exchanged zeolite was then washed with distilled water several times, dried in an oven in air at 110° C. and then calcined at a temperature of 350° C. for 120 minutes. The resulting zeolite was found to contain about 1 wt. % platinum. This catalyst was also used in heptane reforming and the results shown in FIG. 1 hereof.

EXAMPLE 1

Figure 2:
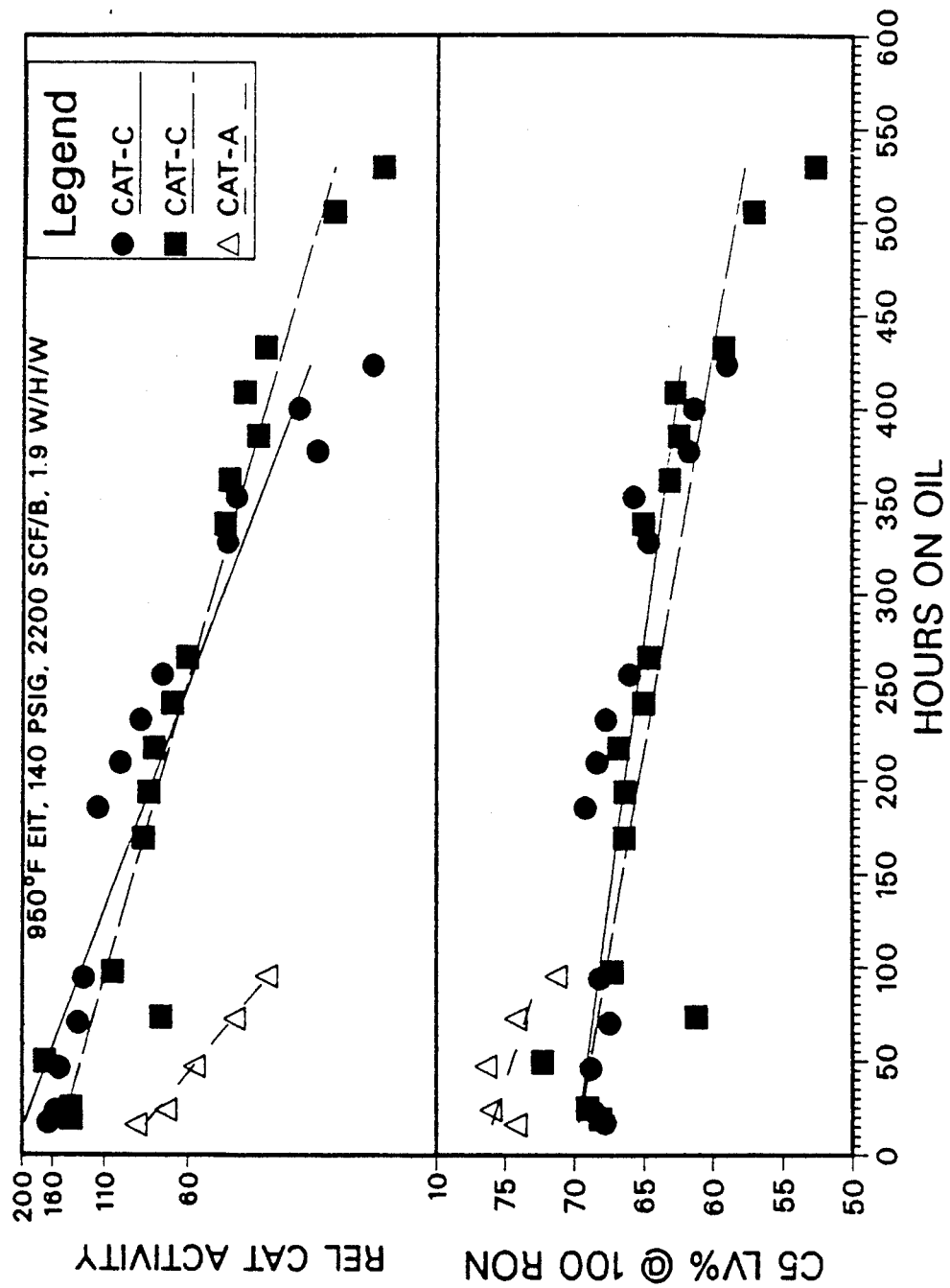
FIG. 2 is a plot of the data obtained for full range naphtha test for Catalysts A and C.

Catalyst C was prepared by blending 20 grams of anhydrous sodium zeolite Y with 0.405 grams of powdered $Pt(acetylacetonate)_2$ for 120 minutes in a flask which was sealed to prevent moisture adsorption. The resulting mixed powders were spread out in a ceramic dish, then quickly placed into a furnace which had been preheated to a temperature of 350° C. for 120 minutes. The furnace had a forced air purge. The resulting catalyst which contained about 1 wt. % platinum was used in heptane reforming, the results of which are shown in FIG. 1, and in full range naphtha reforming, which is shown in FIG. 2 hereof.

COMPARATIVE EXAMPLE 3

Catalyst D was prepared in accordance with the procedure of Example 1 above except that after spreading the catalyst in the ceramic dish it was placed in a furnace at room temperature then heated to a temperature of 150° C. over a 15 minute period, held at that temperature for another 30 minutes, at which point the temperature of the furnace was raised to 200° C. and held there for 120 minutes. The temperature was then raised to 350° C. and held there for another 120 minutes. Since $Pt(acetylacetonate)_2$ is slightly volatile above 180° C., and decomposes above about 200° C., the resulting zeolite will have $Pt(acetylacetonate)_2$ more evenly spread throughout the zeolite structure before it is decomposed than that of Catalyst C. This catalyst was also used in heptane reforming with the results shown in FIG. 1 hereof.

COMPARATIVE EXAMPLE 4

Catalyst E was prepared by mixing 20 grams of anhydrous sodium zeolite Y with 0.342 grams of $Pt(NH_3)Cl_2$ (58.41 % Pt) crystals, then calcined as in Example 1 above. The resulting catalyst which contained 1 wt. % platinum was also used in heptane reforming and results shown in FIG. 1 hereof.

COMPARATIVE EXAMPLE 5

Catalyst F was prepared by mixing 20 grams of anhydrous sodium zeolite Y with 0.500 grams of $H_2PtCl_6.4.32H_2O$ (40.0 % Pt assay) crystals and then calcined as in Example 1 above. This catalyst, which also contained 1 wt. % platinum, was used in heptane reforming the results which are also shown in FIG. 1 hereof.

n-Heptane Reforming Tests

This method of testing reforming catalysts is based on the ability of the catalyst to dehydrocyclize n-heptane to toluene in competition with the other possible reactions with n-heptane and hydrogen feed. Such other reactions include isomerization, hydrogenolysis or cracking, dehydrogenation, and formation of five-ring compounds. Commercially attractive catalysts must show good activity (conversion of feed molecules), good selectivity (formation of toluene), and good stability of activity. That is, the catalyst must make toluene at a substantially constant rate without having the activity for conversion, or toluene make, decline substantially over a reasonable period of time. Catalysts which perform as well, or better than, a standard catalyst are then further tested on full range naphtha feeds. Past experience has shown that catalysts with lesser toluene production rates, or more rapid decline in toluene production, do not reform full range naphtha to desirable octane levels or with the necessary lifetime for commercial applications.

The n-heptane tests were conducted as follows: A 1.60 gram portion of 14/35 mesh beads were held in a ½" stainless steel reactor bed with a ⅛" thermowell located in the center of the reactor tube. The reactor tube was contained in a fluidized electrically heated sandbath at 500° C. The feed was pure n-heptane liquid fed at a rate of 24.0 cm³/hr into a vaporizer. The vaporized liquid was then mixed with 340 cm³/min of pure $H_2$ gas, resulting in a $H_2/n-C_7$ mole ratio of six to one. At this catalyst weight these conditions exposed the catalyst to 10 parts of feed to one part of catalyst per hour. These runs lasted for three to four hours and the products were sampled for chromatographic analysis of several internals over this time period.

Complete hydrocarbon product analyses were done on these products. However, as a quick method of comparing catalysts, a comparison of the catalysts is the toluene rate, i.e., rate of toluene production in grams of toluene made per gram of catalyst per hour.

FIG. 1 shows that Catalyst C, made by the method of this invention, has improved toluene production and at least equal stability when compared with a conventional Pt-Re on $Al_2O_3$ catalyst. Zeolite based catalysts made by prior art methods, while showing slightly better initial toluene production, quickly begin to lose activity. Catalysts B, D, E, and F do not show any advantages over the conventional catalyst, Catalyst A, in this screening test for full range naphtha reforming testing.

Full Range Naphtha Test

The catalyst of this invention, Catalyst C, was tested on a full range naphtha feed and was compared to a conventional Pt-Re on $Al_2O_3$ reforming catalyst, Catalyst A, and the results are depicted in FIG. 2 hereof.

The feed for this test was a desulfurized paraffinic naphtha distilled from Light Arabian crude. The properties of this feed are listed below:

| | |
|---|---|
| Average Molecular Wt. %: | 108.0 |
| Volume % (by MS) | |
| Aromatics | 9.26 |
| Paraffins | 58.74 |
| Naphthenes | 32.00 |
| API Gravity | 59.7 |
| RON | 49.0 |
| Density at 60° F., g/cm$^3$ | 0.7401 |
| ppm H$_2$O | <20 |
| ppm Cl− | <0.1 |
| ppm S | <0.1 |
| ASTM Distillation (DSD-86) | °F. |
| IBP | 181 |
| 5% | 196 |
| 10% | 204 |
| 20% | 211 |
| 30% | 218 |
| 40% | 229 |
| 50% | 241 |
| 60% | 253 |
| 70% | 269 |
| 80% | 287 |
| 90% | 310 |
| 95% | 328 |
| FBP | 356 |

This test simulates use of these catalysts in a high severity cyclic reforming unit. The conventional catalyst was presulfided and contained sufficient Cl-initially to demonstrate typical catalyst performance. The liquid feed rates, H$_2$ feed rate, temperature at start and pressures are typical for this feedstock. The average catalyst temperature was adjusted to maintain a 100±1 octane product.

The actual conditions were 140 psig, 20.0 cm$^3$/hr liquid feed, H$_2$ flow rate 0.15 L/min.

In FIG. 2 hereof, the activity of the zeolite-based catalyst of this invention is seen to be more stable than for the conventional reforming catalyst at comparable liquid yield. The zeolite based catalyst required about 450 hours before the activity was as low as the conventional catalyst at 100 hours.

What is claimed is:

1. A method for producing a noble-metal containing zeolite suitable for catalytic reforming, which method comprises: (a) contacting a zeolite selected from alkaline faujasites and L zeolites and zeolites isostructural thereto, with a noble-metal compound selected from Pt(acetylacetonate)$_2$ and Pd(acetylacetonate)$_2$ for an effective amount of time to incorporate Pt and/or Pd into the pore surface regions of the zeolite, but not to disperse the Pt and/or Pd throughout the entire zeolite; and (b) calcining the so treated zeolite at a temperature from about 250° C. to about 600° C. for an effective amount of time.

2. The method of claim 1 wherein the zeolite is sodium X faujasite or sodium Y faujasite.

3. The method of claim 2 wherein the noble-metal compound is Pt(acetylacetonate)$_2$.

4. The method of claim 1 wherein the zeolite and the noble-metal compound are contacted as a dry-mix.

5. The method of claim 4 wherein the dry-mix is calcined at a temperature from about 300° C. to about 400° C.

6. The catalyst prepared in accordance with claim 1.

7. The catalyst prepared in accordance with claim 3.

* * * * *